US012398862B2

(12) United States Patent
Li et al.

(10) Patent No.: US 12,398,862 B2
(45) Date of Patent: Aug. 26, 2025

(54) LIGHTING FIXTURE

(71) Applicant: Shenzhen Torshare Technology Co., Ltd., Guangdong (CN)

(72) Inventors: Mantie Li, Guangdong (CN); Xuanzhi Li, Guangdong (CN); Jian Peng, Guangdong (CN); Liang Chen, Guangdong (CN); Xiaowu Jiang, Guangdong (CN)

(73) Assignee: SHENZHEN TORSHARE TECHNOLOGY CO., LTD., Guangdong (CN)

( * ) Notice: Subject to any disclaimer, the term of this patent is extended or adjusted under 35 U.S.C. 154(b) by 10 days.

(21) Appl. No.: 18/610,643

(22) Filed: Mar. 20, 2024

(65) Prior Publication Data

US 2025/0207760 A1 Jun. 26, 2025

(30) Foreign Application Priority Data

Dec. 22, 2023 (CN) ......................... 202323532086.6

(51) Int. Cl.
*F21V 14/02* (2006.01)
*F21V 29/77* (2015.01)

(52) U.S. Cl.
CPC .............. *F21V 14/02* (2013.01); *F21V 29/77* (2015.01)

(58) Field of Classification Search
CPC ........... F21V 17/02; F21V 17/06; F21V 14/06
See application file for complete search history.

(56) References Cited

U.S. PATENT DOCUMENTS

| | | | | |
|---|---|---|---|---|
| 2013/0182441 A1* | 7/2013 | Nemeyer | .............. | F21V 14/065 362/277 |
| 2016/0334079 A1* | 11/2016 | Donnini | ................ | F21V 17/102 |
| 2020/0276932 A1* | 9/2020 | Pizetti | ...................... | B60Q 3/20 |

* cited by examiner

*Primary Examiner* — Eric T Eide
(74) *Attorney, Agent, or Firm* — Scully, Scott, Murphy & Presser, P.C.

(57) ABSTRACT

The present disclosure provides a lighting fixture. The lighting fixture includes: a light emitting plate, a rotating shaft and a light transmitting plate. The rotating shaft is mounted on a light exiting side of the light emitting plate. The light transmitting plate is located on the light exiting side of the light emitting plate and is rotatably connected to the rotating shaft. Light emitted from the light emitting plate comes out after passing through the light transmitting plate. When the light transmitting plate is driven to make a rotating movement around a center axis of the rotating shaft, a distance between the light transmitting plate and the light emitting plate changes, and light exiting angle of the light which is emitted from the light emitting plate and then passes through the light transmitting plate coming out changes accordingly.

13 Claims, 12 Drawing Sheets

LIGHTING FIXTURE

CROSS-REFERENCE TO RELATED APPLICATION

This application claims priority under 35 U.S.C. § 119 (a) to Chinese Patent Application No. 202323532086.6, filed Dec. 22, 2022. The entire disclosure of Chinese Patent Application No. 202323532086.6 is hereby incorporated by reference.

TECHNICAL FIELD

The present disclosure relates to a field of lighting, and in particular to a lighting fixture.

BACKGROUND

In the prior art, a light exiting angle of a lamp is generally fixed. Of course, there are some lamps that can adjust their light exiting angles, but an adjustment structure of the light exiting angle of these lamps is complicated, has many parts, is costly, is not easy to operate, and causes inconvenience to the user.

SUMMARY

In view of this, the present disclosure provides a lighting fixture, which can solve the above technical problems.

The present disclosure provides a lighting fixture. The lighting fixture includes: a lighting emitting plate, a rotating shaft, and a light transmitting plate. The rotating shaft is mounted on a light exiting side of the lighting emitting plate. The light transmitting plate is located on the light exiting side of the lighting emitting plate, and is rotatably connected to the rotating shaft. Light emitted from the light emitting plate comes out after passing through the light transmitting plate. When the light transmitting plate is driven to make a rotating movement around a center axis of the rotating shaft, a distance between the light transmitting plate and the light emitting plate changes, and a light exiting angle of the light which is emitted from the light emitting plate and then passes through the light transmitting plate coming out changes accordingly.

In some possible embodiments of the present disclosure, a circumferential wall of the rotating shaft defines a plurality of spiral grooves; the lighting fixture includes a plurality of plug elements; the plurality of plug elements are in one-to-one correspondence with the plurality of spiral grooves; each of the plurality of plug elements includes a first end and a second end set opposite to the first end, the first end of each plug element is connected to the light transmitting plate, the second end of each plug element is inserted into the corresponding spiral groove and is capable of sliding within the spiral groove following the rotating movement of the light transmitting plate.

In some possible embodiments of the present disclosure, the spiral groove has at least two limiting points within the spiral groove; the at least two limiting points are spaced apart within the spiral groove along a spiral direction of the spiral groove; when the plug element is clamped to different limiting points within the spiral groove, the distance between the light transmitting plate and the light emitting plate is different, and the light which is emitted from the light emitting plate and then passes through the light transmitting plate comes out at different light exiting angles.

In some possible embodiments of the present disclosure, the spiral groove includes a spiral portion, the at least two limiting points are defined within the spiral portion.

In some possible embodiments of the present disclosure, the spiral groove further includes a transition portion and an insertion portion; the transition portion interconnects the spiral portion with the insertion portion; the rotating shaft further includes an end face at a side away from the light emitting plate; and the insertion portion extends from the circumferential wall of the rotating shaft and penetrates through the end face of the rotating shaft.

In some possible embodiments of the present disclosure, an opening of the insertion portion in the end face of the rotating shaft is larger than an outer diameter of the second end of the plug element.

In some possible embodiments of the present disclosure, the spiral portion includes a first sidewall surface close to the end face; the spiral portion includes a stop portion formed on an end of the spiral portion close to the transition portion; the stop portion closes to the opening of the insertion portion and protrudes from the first sidewall surface toward a side away from the end face.

In some possible embodiments of the present disclosure, the spiral portion includes a first sidewall surface close to the end face, the spiral portion further includes a second sidewall surface at a side away from the end face; the second end of the plug element includes a convex ring; and the convex ring is mated with the first sidewall surface and the second sidewall surface of the spiral portion, respectively.

In some possible embodiments of the present disclosure, the light transmitting plate further includes a light transmitting portion and a mounting portion; the light transmitting portion surrounds the mounting portion; the mounting portion is recessed relative to the light transmitting portion to form a recess on a side away from the light emitting plate; an inner side wall of the recess defines a plurality of mounting holes; the first ends of the plurality of plug elements are connected within the plurality of mounting holes, respectively.

In some possible embodiments of the present disclosure, the lighting fixture further includes a limiting member and a heat sink, the heat sink includes a circumferential sidewall and a mounting plate; the circumferential sidewall surrounds the mounting plate to form a mounting groove; the light emitting plate and the light transmitting plate are mounted within the mounting groove; the light transmitting plate is located on a side of the light emitting plate away from the heat sink; the limiting member is located on a side of the light transmitting plate away from the light emitting plate; one end of the limiting member is connected to the circumferential sidewall, and the other end of the limiting member is resting against a surface of the light transmitting plate away from the light emitting plate.

In some possible embodiments of the present disclosure, the light transmitting plate includes a limiting portion at an edge of a side of the light transmitting plate away from the light emitting plate; the limiting portion cooperates with the limiting member to limit the rotating movement of the light transmitting plate relative to the light emitting plate.

In some possible embodiments of the present disclosure, the mounting portion includes a connection port; the light fixture further includes a communication module; the communication module is mounted on the connection port.

Therefore, in the present disclosure, the light which is emitted from the light emitting plate and then passes through the light transmitting plate comes out. A magnitude of a distance between the light transmitting plate and the light emitting plate is related to a light exiting angle of the light which is emitted from the light emitting plate and then passes through the light transmitting plate coming out. When the distance between the light transmitting plate and the light emitting plate changes, the light exiting angle of the light which is emitted by the light emitting plate and passes through the light transmitting plate coming out is changed accordingly. Therefore, by rotating the light transmitting plate to adjust the distance between the light transmitting plate and the light emitting plate, the light exiting angle of the light which is emitted from the light emitting plate coming out and then passes through the light transmitting plate can be adjusted, which can simplify the structure, reduce the parts, reduce the costs, and facilitate the operations of the user.

BRIEF DESCRIPTION OF THE ACCOMPANYING DRAWINGS

To describe the technology solutions in the embodiments of the present disclosure more clearly, the following briefly introduces the accompanying drawings required for describing the embodiments. Obviously, the accompanying drawings in the following description show merely at least one embodiment of the present disclosure, those of ordinary skilled in the art may also obtain other drawings based on these drawings without any creative efforts.

DETAILED DESCRIPTION OF ILLUSTRATED EMBODIMENTS

Embodiments of the present disclosure are described in detail below, and examples of the embodiments are shown in the accompanying drawings, wherein the same or similar labeling throughout denotes the same or similar elements or elements having the same or similar functions.

The embodiments described below with reference to the accompanying drawings are exemplary and are intended to be used to explain the present disclosure and are not to be construed as a limitation of the present disclosure.

It should be noted that all directional indications (e.g., up, down, left, right, front, back . . . ) in the embodiments of the present disclosure are only used to explain the relative positional relationship, movement and the like among the components in a particular state (as shown in the accompanying drawings), and that the directional indications are correspondingly changed if the particular state is changed.

Furthermore, the terms “first” and “second” are used only for descriptive purposes, and are not to be construed as indicating or implying relative importance or implicitly specifying the number of technical features indicated. Thus, a feature defined with “first” or “second” may include one or more such features, either explicitly or implicitly. In the description of the present disclosure, “plurality of” means two or more, unless otherwise expressly and specifically limited.

In this application, unless otherwise expressly specified and limited, the terms “connected”, “fixed”, etc. are to be understood broadly, e.g., they may be fixedly connected, removably connected, or integrally connected; they may be mechanically connected or electrically connected; they may be directly connected or indirectly connected through an intermediate medium, a connection within two elements or an interactive relationship between two elements. For those of ordinary skill in the art, the specific meanings of the above terms in this application may be understood on a case-by-case basis.

Figure 1:
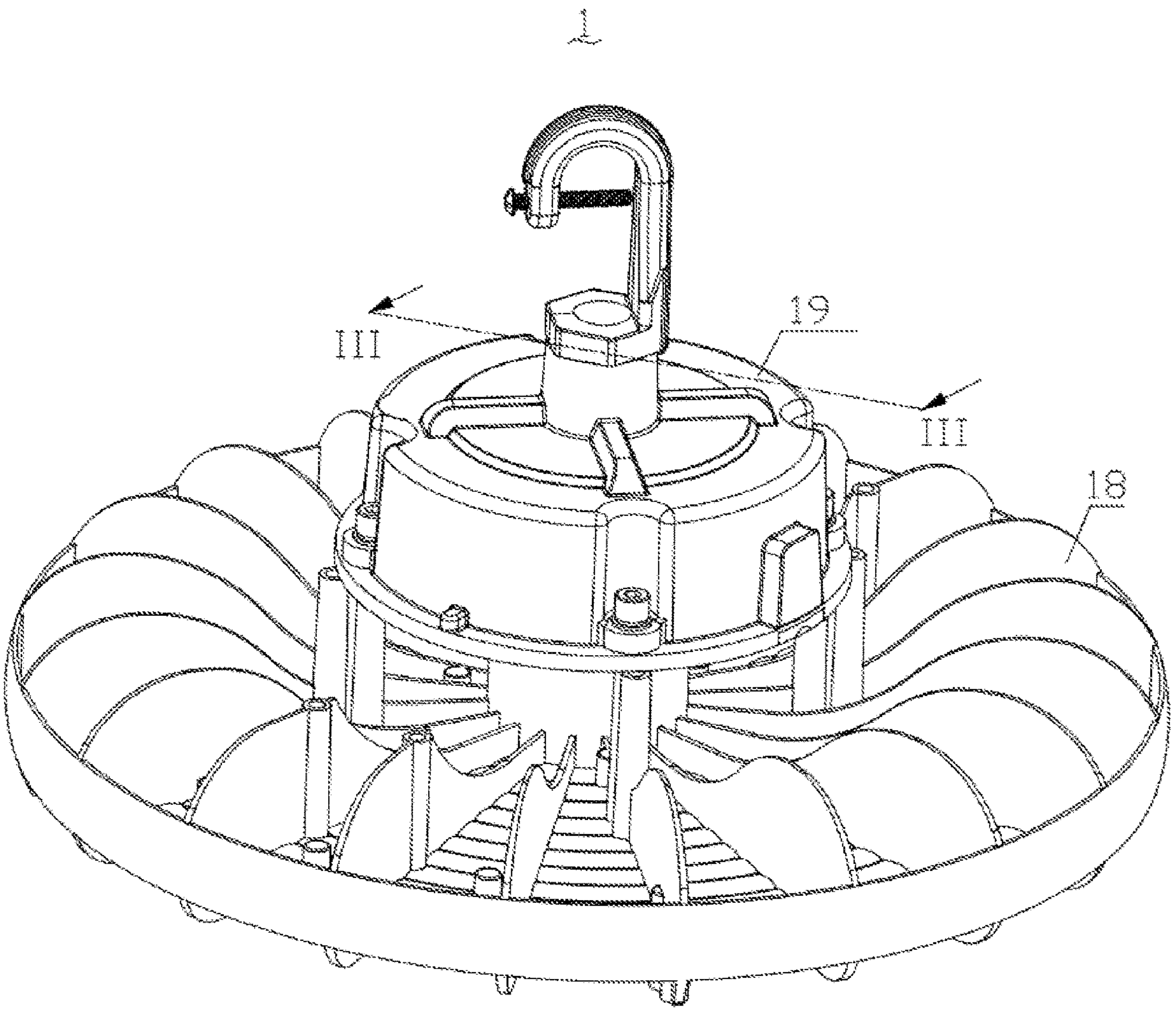
FIG. 1 illustrates a schematic view of a three-dimensional structure of a lighting fixture in accordance with one embodiment of the present disclosure.
Figure 2:
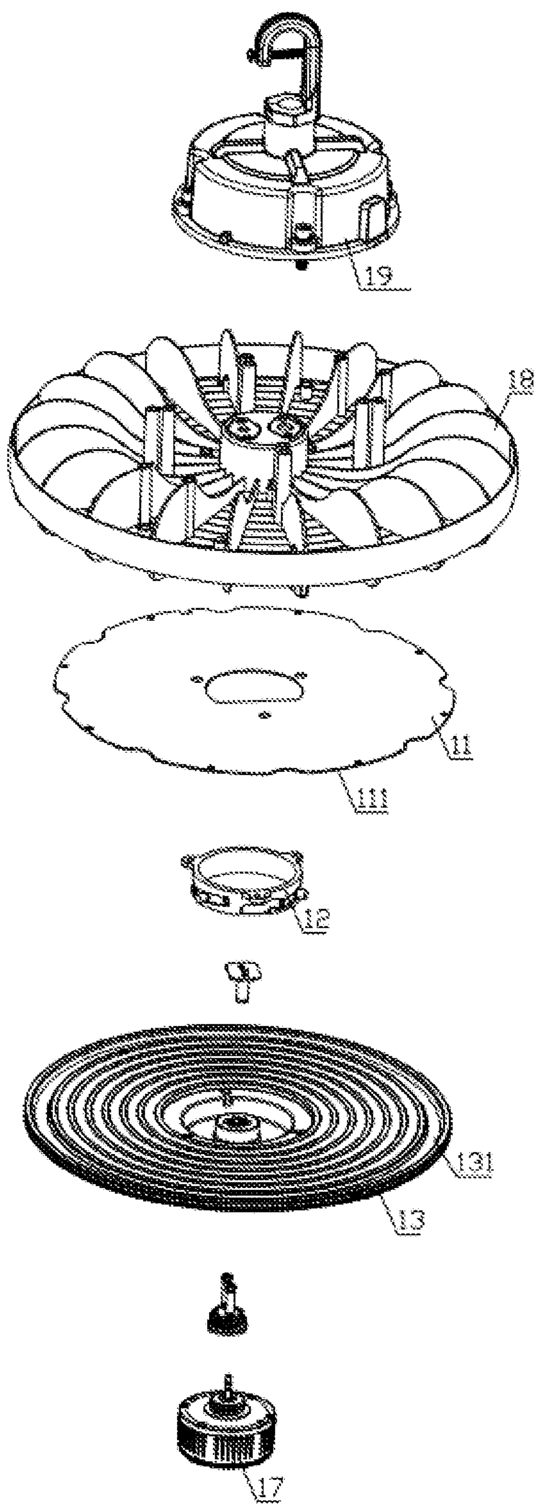
FIG. 2 illustrates an exploded view of FIG. 1.
Figure 3:
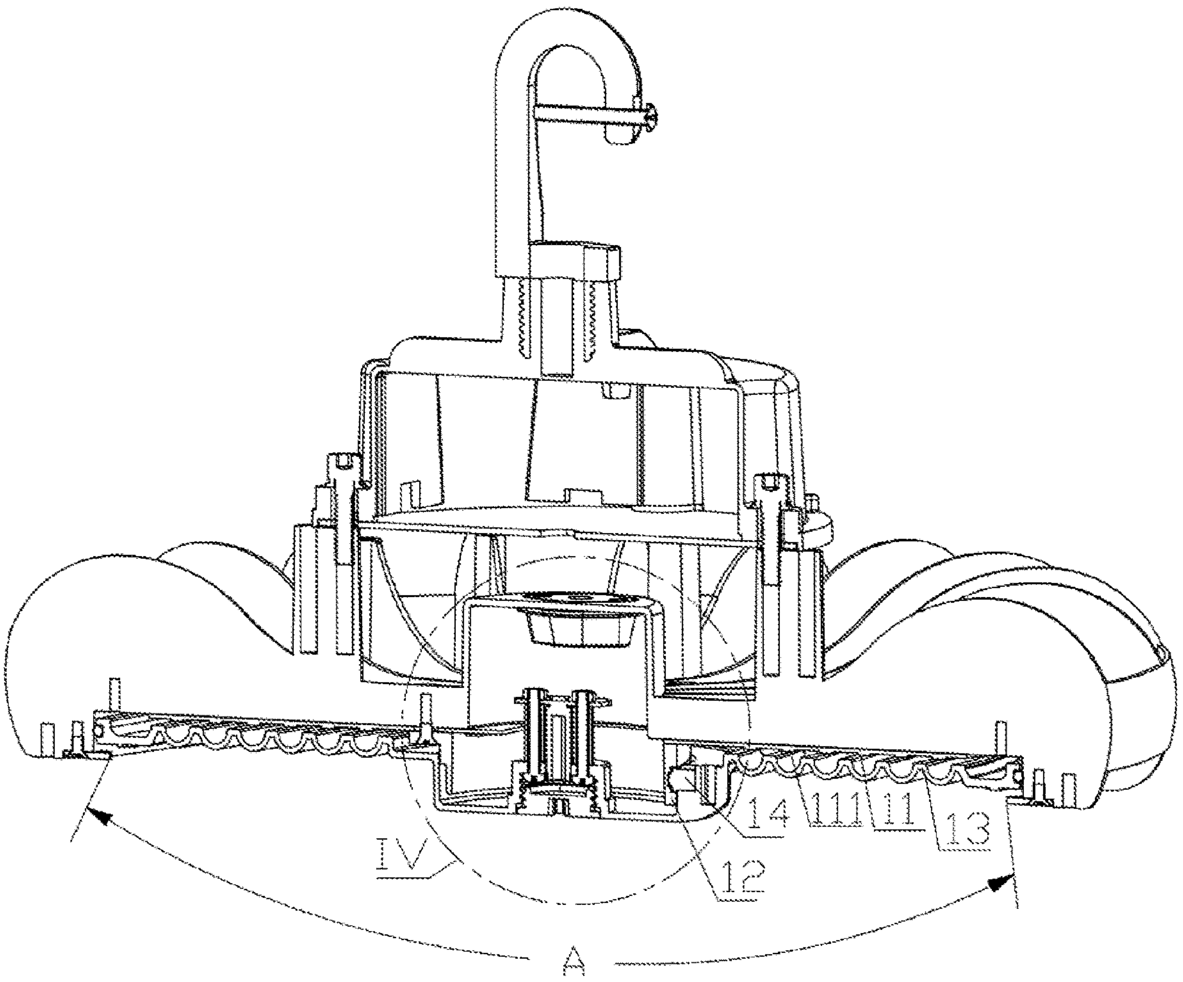
FIG. 3 illustrates a cross-sectional view of FIG. 2 taken along a line III-III.
Figure 4:
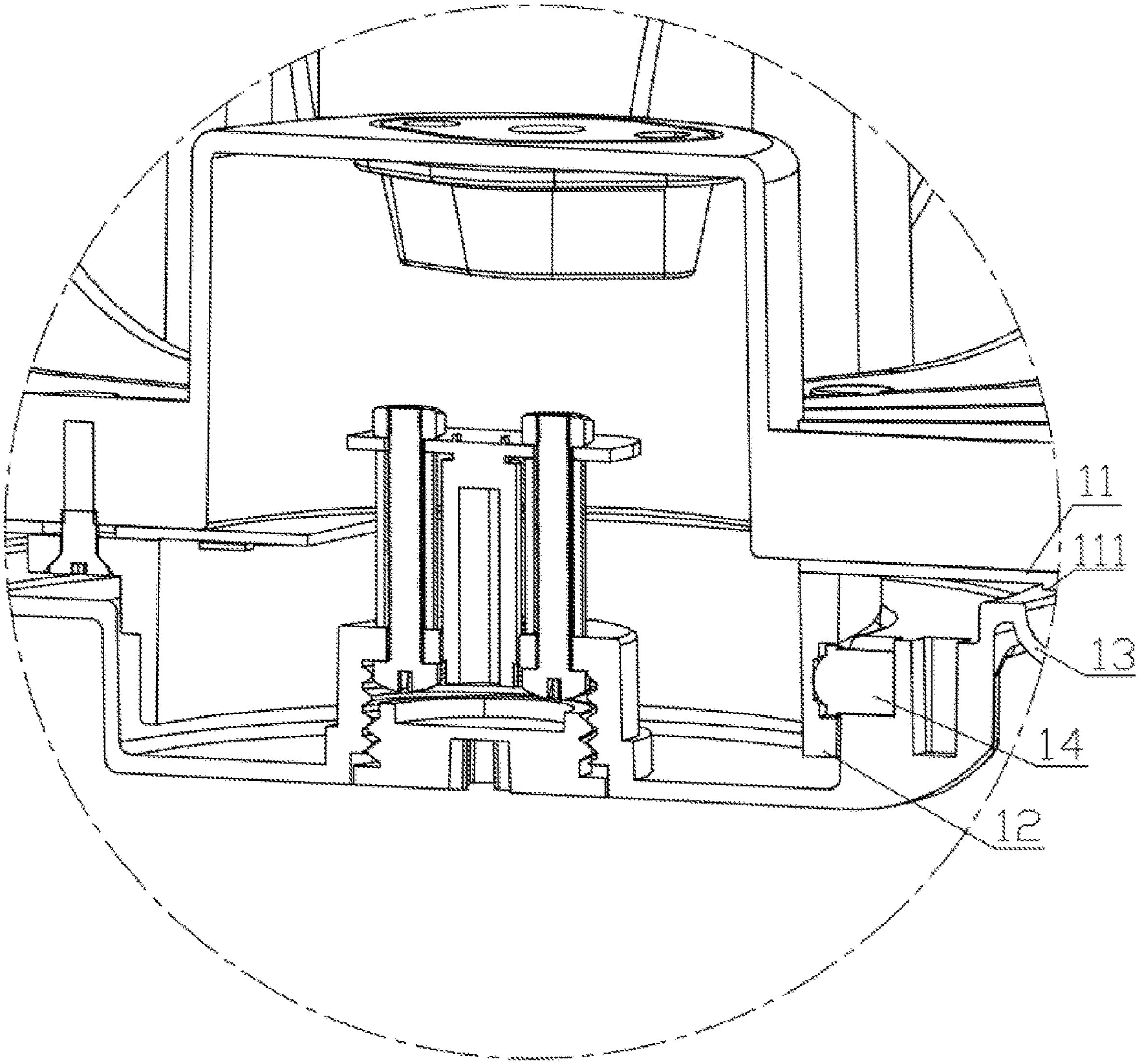
FIG. 4 illustrates a partial enlarged view of FIG. 3 at IV.

Referring to FIGS. 1 to 4, FIG. 1 illustrates a schematic view of a three-dimensional structure of a lighting fixture 1 in accordance with one embodiment of the present disclosure; FIG. 2 illustrates an exploded view of FIG. 1; FIG. 3 illustrates a cross-sectional view of FIG. 2 taken along a line III-III; FIG. 4 illustrates a partial enlarged view of FIG. 3 at IV.

As shown in FIG. 2, the lighting fixture 1 includes a lighting emitting plate 11, a rotating shaft 12, and a light transmitting plate 13. The light emitting plate 11 includes a light exiting side 111. The light exiting side 111 is a side of the light emitting plate 11 close to the light transmitting plate 13. As shown in FIGS. 3 and 4, the rotating shaft 12 is mounted on the light exiting side 111 of the lighting emitting plate 11. The light transmitting plate 13 is located on the light exiting side 111 of the lighting emitting plate 111, and is rotatably connected to the rotating shaft 12. Light emitted from the light emitting plate 11 passes through the light transmitting plate 13 and comes out. When the light transmitting plate 13 is driven to make a rotating movement around a center axis of the rotating shaft 12, a distance between the light transmitting plate 13 and the light emitting plate 11 is changed, and a light exiting angle of the light which is emitted from the light emitting plate 11 and passes through the light transmitting plate 13 coming out changes accordingly. The light exiting angle is an angle A at which all light emitted from the light emitting plate 11 is distributed after coming out the light transmitting plate 13.

Therefore, in this application, the light which is emitted from the light emitting plate 11 and passes through the light transmitting plate 13 comes out. A magnitude of the distance between the light transmitting plate 13 and the light emitting plate 11 is related to a light exiting angle of the light which is emitted from the light emitting plate 11 and then passes through the light transmitting plate 13 coming out. When the distance between the light transmitting plate 13 and the light emitting plate 11 changes, the light exiting angle of the light which is emitted by the light emitting plate 11 and then passes through the light transmitting plate 13 coming out is changed accordingly. Therefore, by rotating the light transmitting plate 13 to adjust the distance between the light transmitting plate 13 and the light emitting plate 11, the light exiting angle of the light which is emitted from the light emitting plate 11 and passes through the light transmitting plate 13 coming out can be adjusted, which can simplify the structure, reduce the parts, reduce the costs, and facilitate the operations of the user.

In some embodiments, the light emitting plate 11 may emit light. For example, the light emitting plate 11 is mounted with at least one light strip on one side of the light emitting plate 11 towards the light transmitting plate 13; the light strip may be, but is not limited to, an LED light strip; the light strip is a plurality of light strip circles spreading from a center of the light transmitting plate 11 towards an edge of the light transmitting plate 11. In another embodiment, the light strip may be arranged in a zigzag pattern, etc. The light strip may emit light. In other embodiments, the light emitting plate 11 may include a plurality of light beads on a side of the light emitting plate 11 towards the light transmitting plate 13. The light beads may emit light and are not limited herein.

Therefore, the light emitting plate 11 is capable of emitting light and the emitted light comes out after passing through the light transmitting plate 13.

In some embodiments, referring again to FIGS. 2 and 3, the light transmitting plate 13 is of semi-transparent plastic or a semi-transparent glass structure. The light transmitting plate 13 protrudes outwardly towards one side away from the light emitting plate 11. The light transmitting plate 13 spreads outwardly from a center of the light transmitting plate 13 in a uniform arrangement to form a plurality of tubular light transmission circles 131. A depth of depression of each light transmission circle 131 close to one side of the light emitting plate 11 is 3~5 mm. A diameter of the pipeline of each light transmission circle 131, i.e., a radial width, is 6.4-10 mm. A distance between the centers of two adjacent light transmission circles 131 is 10-15 mm. It is understood that in other embodiments, the depth of depression of the light transmission circle 131 and the diameter of the light transmission circle 131 can be adjusted according to the actual needs.

Therefore, the lighting fixture 1 of the present disclosure, as a result of using the light transmitting plate 13 with a plurality of light transmission circles 131 having the above-described parameters, such that its UGR (Unified Glare Rating) values are all less than 28, glare may be reduced.

Figure 5:
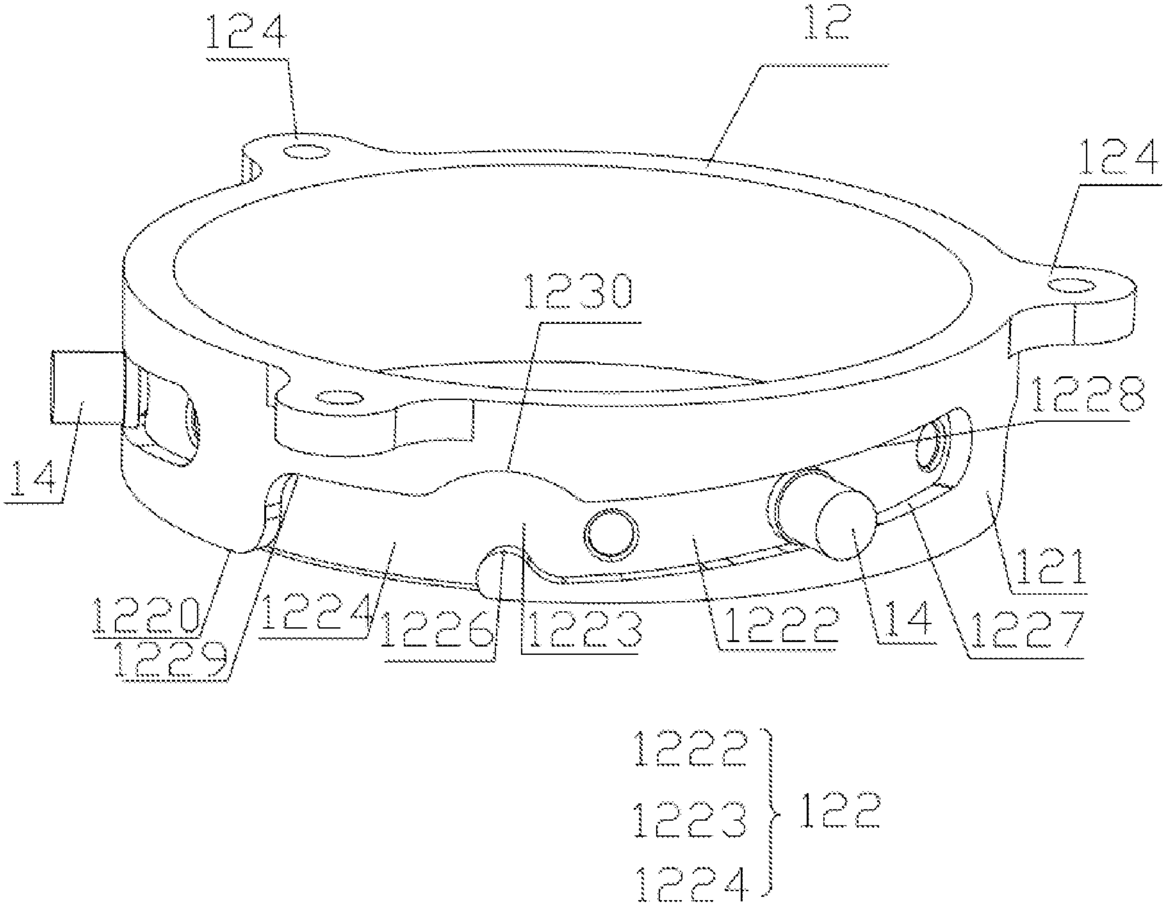
FIG. 5 illustrates a schematic view of an assembly of a rotating shaft and a plug element in accordance with one embodiment of the present disclosure.
Figure 6:
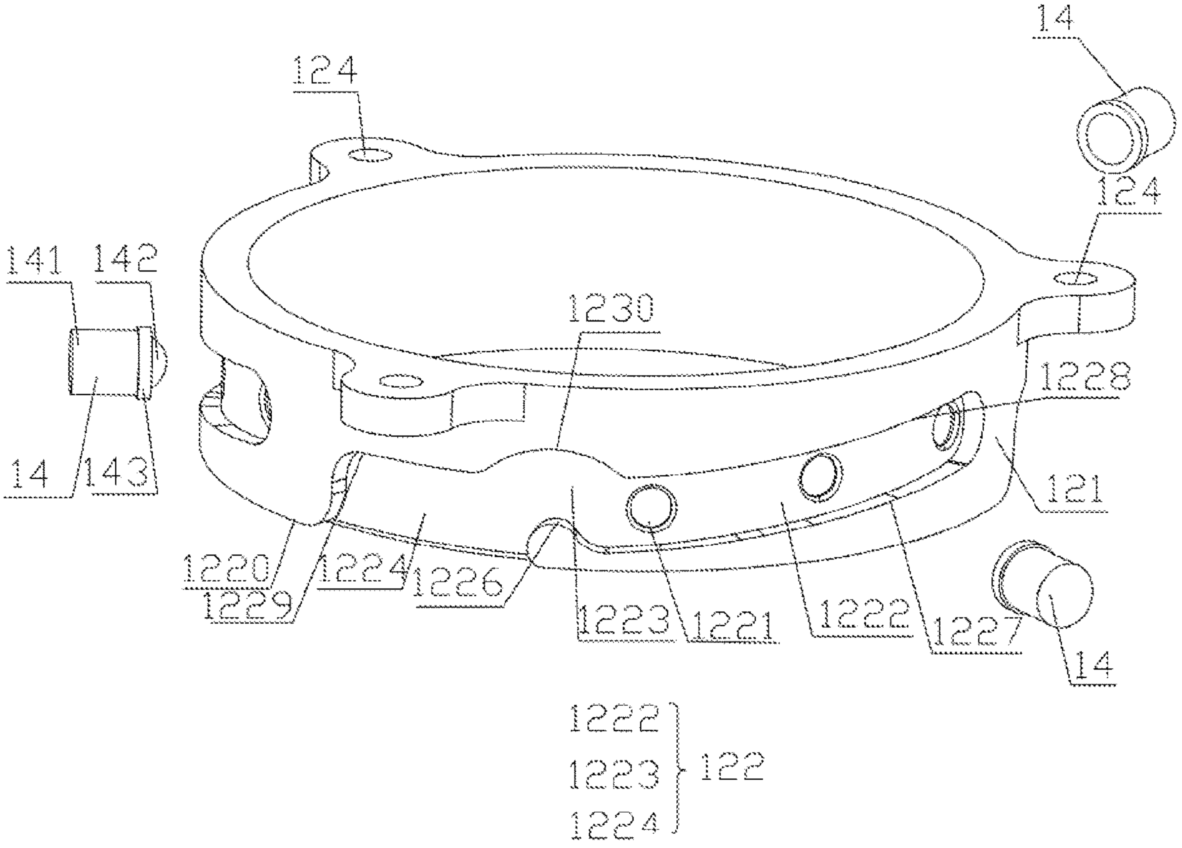
FIG. 6 illustrates an exploded view of FIG. 5.

For some embodiments, please referring to FIGS. 5 and 6 together, FIG. 5 illustrates a schematic view of an assembly of a rotating shaft 12 and a plug element 14 in accordance with one embodiment of the present disclosure; FIG. 6 illustrates an exploded view of FIG. 5. The rotating shaft 12 is cylindrical in shape. The rotating shaft 12 has a circumferential wall 121. The circumferential wall 121 defines a plurality of spiral grooves 122. The plurality of spiral grooves 122 are spiral grooves having a center axis of the rotating shaft 12 as a rotating axis. The lighting fixture 1 includes a plurality of plug elements 14. The plurality of plug elements 14 are in one-to-one correspondence with the plurality of spiral grooves 122. Each plug element 14 includes a first end 141 and a second end 142 opposite to the first end 141. The first end 141 of each plug element 14 is connected to the light transmitting plate 13, and the second end 142 of each plug element 14 is inserted into the corresponding spiral groove 122. The plug element 14 is capable of sliding within the spiral groove 122 following a rotating movement of the light transmitting plate 13.

Therefore, through the cooperation of the plug element 14 with the spiral groove 122 on the rotating shaft 12, the rotating movement of the light transmitting plate 13 relative to the rotating shaft 12 can be more stable and reliable, with better stroke stability.

In some embodiments, referring again to FIGS. 5 and 6, the plurality of spiral grooves 122 are spaced apart in a circumferential direction of the circumferential wall 121 of the rotating shaft 12. In this embodiment, the plurality of spiral grooves 122 includes three spiral grooves 122, and the three spiral grooves 122 are spaced apart in the circumferential direction of the circumferential wall 121 of the rotating shaft 12. It can be appreciated that the three spiral grooves 122 have the same structural shape and are simply distributed at different locations in the circumferential direction of the circumferential wall 121 of the rotating shaft 12. In other embodiments, the number of the spiral grooves 122 is not limited to three, but may be one, two, four or more than four, without limitation herein.

In some embodiments, referring again to FIGS. 5 and 6, the spiral groove 122 includes at least two limiting points 1221. The at least two limiting points 1221 are spaced apart within the spiral groove 122 along a spiral direction of the spiral groove 122. When the plug element 14 engages with different limiting points 1221 within the spiral groove 122, the light transmitting plate 13 and the light emitting plate 11 are at different distances, and the light which is emitted by the light emitting plate 11 and then passes through the light transmitting plate 13 comes out at different light exiting angles. In this embodiment, the at least two limiting points 1221 include three limiting points 1221, and the three limiting points 1221 are spaced apart within the spiral groove 122 along the spiral direction of the spiral groove 122. Thus, the light which is emitted by the light emitting plate 11 and then passes through the light transmitting plate 13 comes out at three light exiting angles, e.g., 60°, 85° and 110° respectively. In other embodiments, the at least two limiting points 1221 include, but are not limited to, three limiting points 1221, and the light which is emitted by the light emitting plate 11 and then passes through the light transmitting plate 13 comes out at a light exiting angle including, but is not limited to, 60°, 85° and 110°, without limitation herein.

Therefore, in sliding in the spiral groove 122 following the rotating movement of the light transmitting plate 13, the plug element 14 may be engaged with different limiting points 1221 within the spiral groove 122 to define the light emitting plate 11 relative to the light transmitting plate 13 at different light exiting angles.

In some embodiments, the limiting point 1221 is a recess, and the plug element 14 is an elastic pin.

Therefore, when the plug element 14 slides within the spiral groove 122 but does not slide to a position at the current limiting point 1221, the plug element 14 is in an elastic compression state. When the plug element 14 slides within the spiral groove 122 to a position at the current limiting point 1221, the plug element 14 extends under its elastic restoring force into the current limiting point 1221 and engages with the current limiting point 1221. When it is necessary to adjust the light exiting angle of the light emitting plate 11 relative to the light transmitting plate 13, the light transmitting plate 13 is rotated, the light transmitting plate 13 drives the plug element 14 to move, causing the plug element 14 to be compressed and retracted to overcome the resistance generated by the current limiting point 1221, and forcing the plug element 14 to detach from the current limiting point 1221 and to continue moving to a next limiting point 1221 and engage with the next limiting point 1221.

In some embodiments, an inner wall surface of the recess of the limiting point 1221 is a wedge-shaped surface. Therefore, an end of the second end 142 of the plug element 14 is also wedge-shaped.

Therefore, since the inner wall surface of the recess of the limiting point 1221 is a wedge-shaped surface and the end of the second end 142 of the plug element 14 is also wedge-shaped, the plug element 14 is able to be inserted into the limiting point 1221 or out of the limiting point 1221 much more easily by the fit of the wedge-shaped surface and the wedge-shaped end.

In some embodiments, referring again to FIGS. 5 and 6, the spiral groove 122 includes a spiral portion 1222, a transition portion 1223 and an insertion portion 1224. The at least two limiting points 1221 are defined within the spiral portion 1222. The transition portion 1223 interconnects the spiral portion 1222 with the insertion portion 1224. The rotating shaft 12 further includes an end face 1220 at a side away from the light emitting plate 11. The insertion portion 1224 extends from a circumferential wall 121 of the rotating shaft 12 and penetrates through the end face 1220 of the rotating shaft 12.

Therefore, when the light transmitting plate 13 with the plug elements 14 mounted thereon is sleeved with the rotating shaft 12, the second end 142 of the plug element 14 can slide through the insertion portion 1224 into the spiral portion 1222; after the second end 142 of the plug element 14 has been inserted into the insertion portion 1224, the light transmitting plate 13 is driven to rotate, the light transmitting plate 13 drives the plug element 14 to run through the transition portion 1224, and slides into the spiral portion 1222, simplifying an operation of sleeve the light transmitting plate 13 with the plug element 14 to the rotating shaft 12.

In some embodiments, the insertion portion 1224 has an opening dimension on the end face 1220 of the rotating shaft 12 that is larger than an outer diameter of the second end 142 of the plug element 14.

Therefore, since the opening dimension of the insertion portion 1224 on the end face 1220 of the rotating shaft 12 is larger than the outer diameter of the second end 142 of the plug element 14, the second end 142 of the plug element 14 can be inserted into the insertion portion 1224 more easily, further simplifying the process of insertion operation of inserting the light transmitting plate 13 with the plug elements 14 mounted on the rotating shaft 12.

In some embodiments, referring again to FIGS. 5 and 6, the spiral portion 1222 includes a first sidewall surface 1227 close to the end face 1220. The spiral portion 1222 has a stop portion 1226 formed on an end close to the transition portion 1223. The stop portion 1226 is adjacent to an opening of the insertion portion 1224 and protruded from the first sidewall surface 1227 towards a direction away from the end face 1220.

Therefore, when the plug element 14 slides within the spiral portion 1222, the stop portion 1226 provides a limit to the sliding of the plug element 14 within the spiral portion 1222, avoiding that during normal adjustment of the light exiting angle of the light transmitting plate 13 relative to the light emitting plate 11, the plug element 14 slips out of the spiral portion 1222, which causes the light transmitting plate 13 to separate from the light emitting plate 11, thereby causing operational inconvenience to the user.

In some embodiments, the spiral portion 1222 includes a second sidewall surface 1228 on a side away from the end face 1220, and in some embodiments, the distance between the first sidewall surface 1227 and the second sidewall surface 1228 of the spiral portion 1222 is approximately equal to a maximum outer diameter of the plug element 14.

Therefore, the spiral portion 1222 may provide a stable and reliable guiding action for the plug element 14.

In some embodiments, the second end 142 of the plug element 14 includes a convex ring 143. The convex ring 143 is configured to cooperate with the first sidewall surface 1227 and the second sidewall surface 1228 of the spiral portion 1222, respectively. In this way, the plug element 14 other than the convex ring 143 can have a smaller outer diameter size relative to the convex ring 143, which can save the cost of material used for the plug element 14 and reduce the overall weight of the lighting fixture 1.

In some embodiments, the insertion section 1224 includes a third sidewall surface 1229 at a side away from the end face 1220. The second sidewall surface 1228 and the third sidewall surface 1229 are substantially flush. A fourth sidewall surface 1230 of the transition section 1223 on the side away from the end face 1220 is recessed relative to the second sidewall surface 1228 and the third sidewall surface 1229 toward the side away from the end face 1220. As a result, the transition portion 1223 is substantially in a shape of a curved moon. The fourth sidewall surface 1230 is located face to face with the stop portion 1226.

Therefore, the transition portion 1223 itself has an effect of limiting the plug element 14.

In some embodiments, the rotating shaft 12 includes a plurality of first mounting portions 124 located on a side of the light emitting plate 11 close to the light emitting plate 11. The rotating shaft 12 is mounted to the surface of the light exiting side 111 of the light emitting plate 11 through the plurality of first mounting portions 124. In some specific embodiments, the plurality of the first mounting portions 124 are a plurality of lugs spaced apart and projecting outwardly from a side of a circumferential wall 121 of the rotating shaft 12 proximate the light emitting plate 11. In other embodiments, the first mounting portions 124 may be connected to form a mounting ring. In other embodiments, the first mounting portions 124 may also be mounting holes defined on an end face of the rotating shaft 12 close to the light emitting plate 11. No limitation is made herein.

It can be appreciated that in some other embodiments, the transition portion 1223 and the insertion portion 1224 may be omitted.

Figure 7:
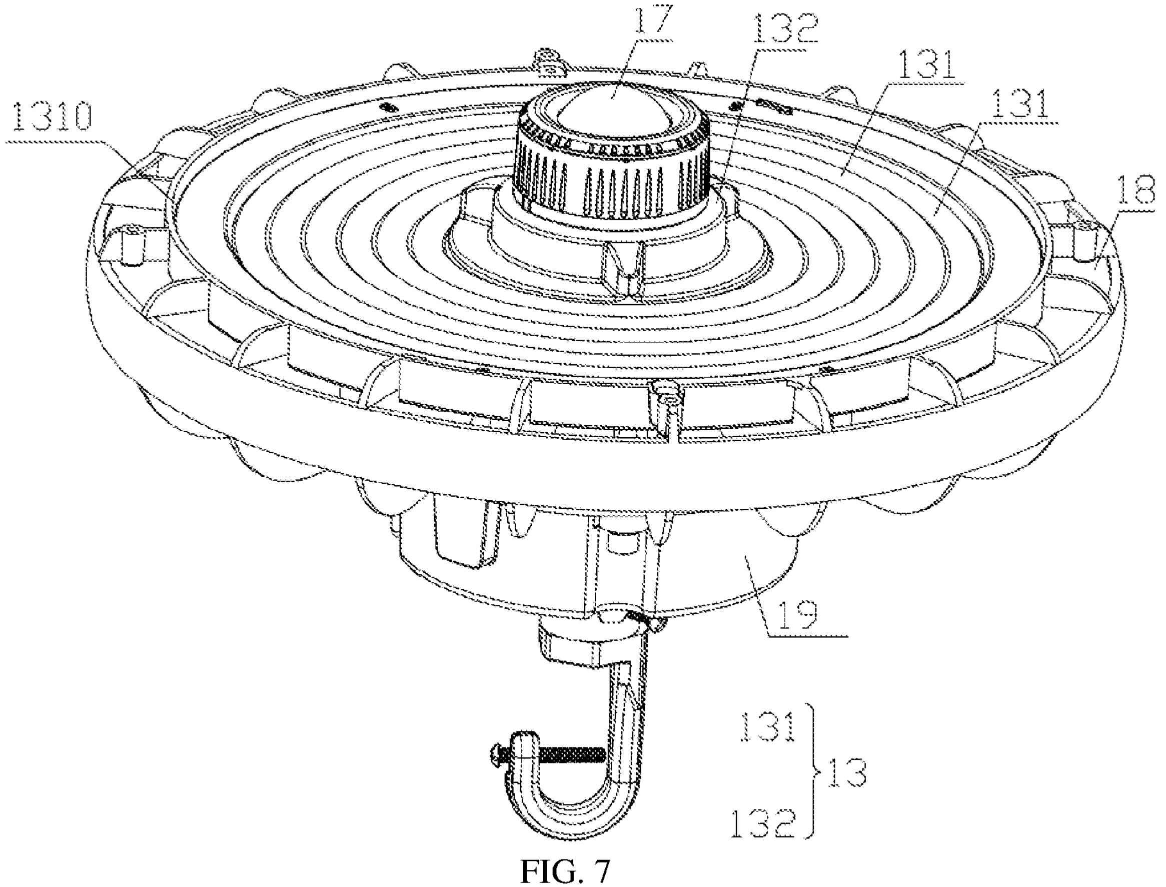
FIG. 7 illustrates a schematic view of a three-dimensional structure of the lighting fixture of FIG. 1 from another view.
Figure 8:
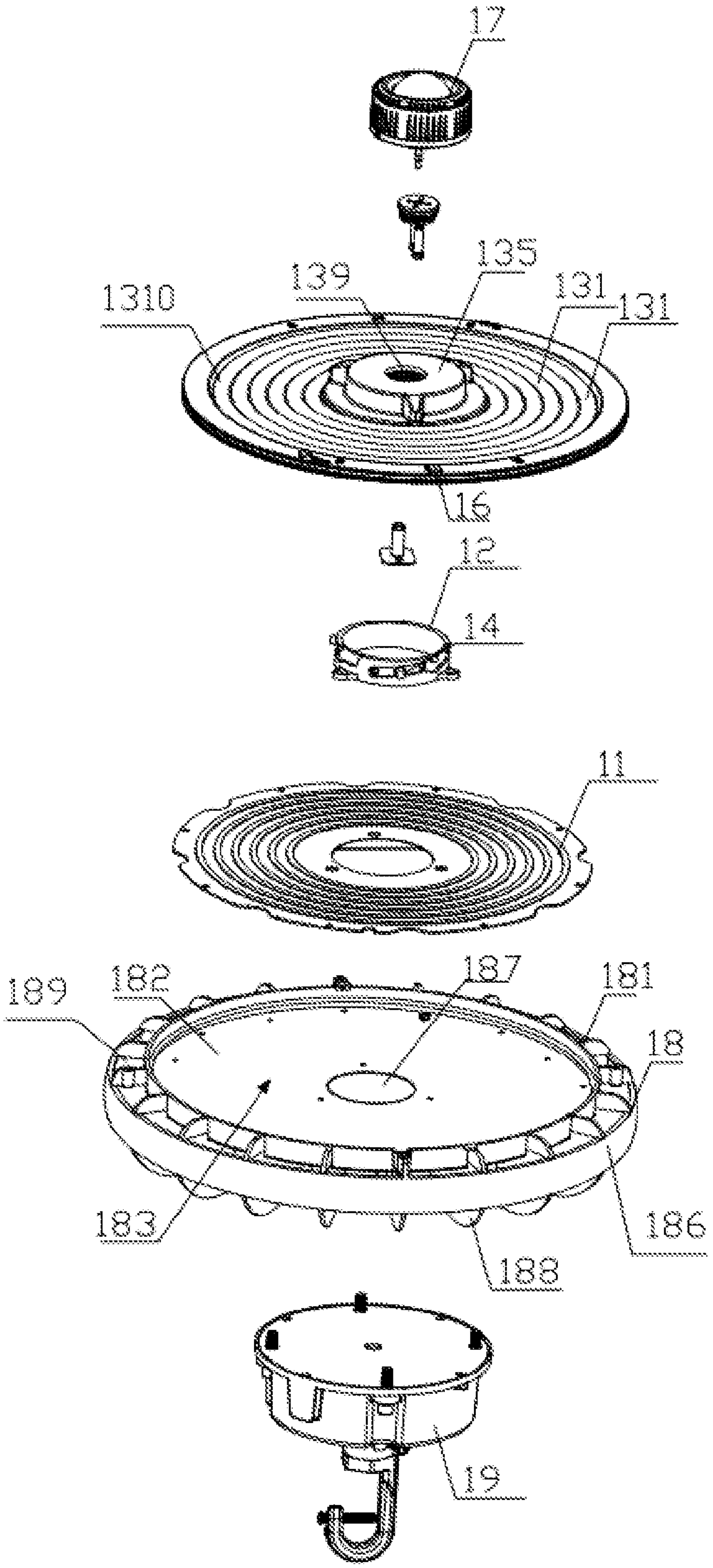
FIG. 8 illustrates an exploded view of FIG. 7.
Figure 9:
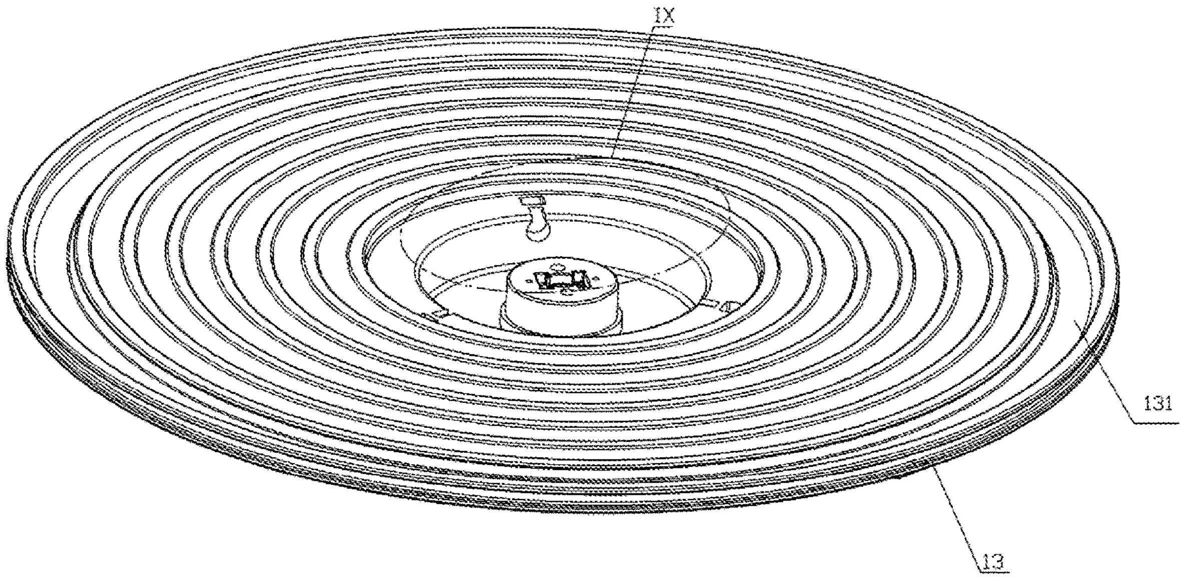
FIG. 9 illustrates an enlarged view of a light transmitting member of FIG. 2.
Figure 10:
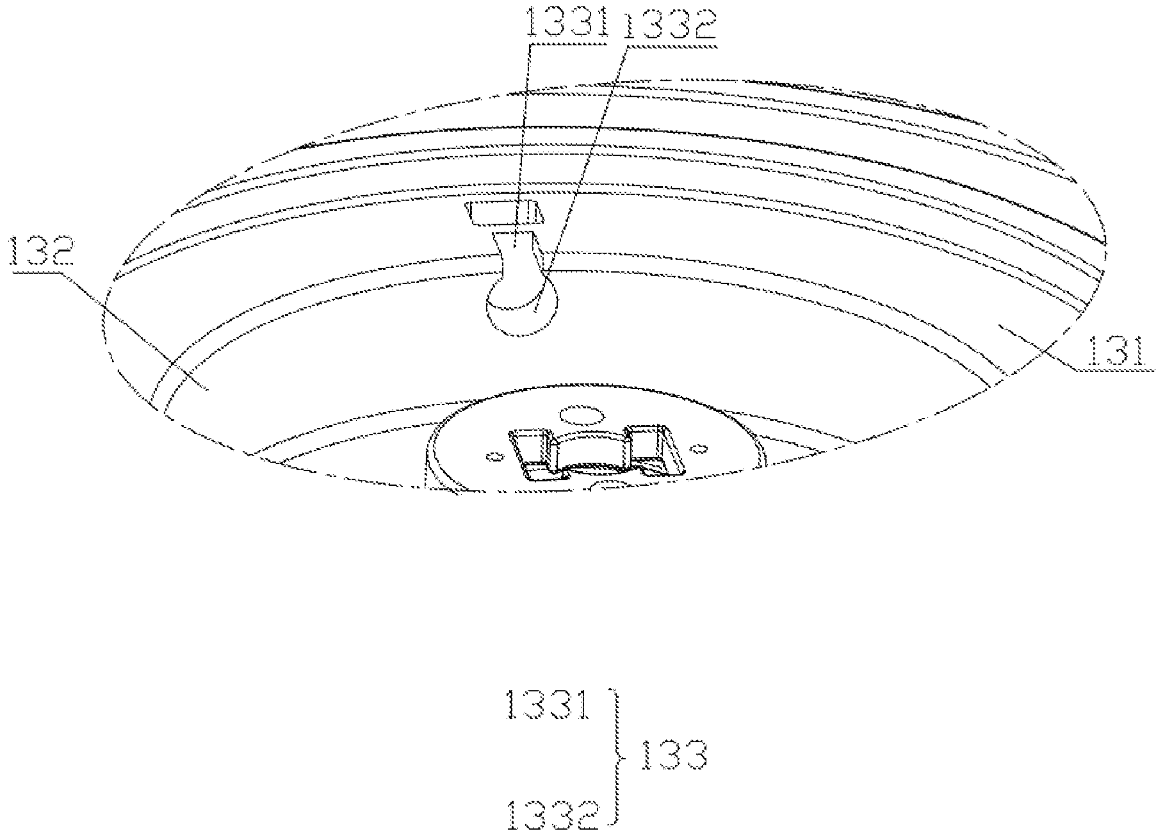
FIG. 10 illustrates a partially enlarged view of FIG. 9 at IX.

In some embodiments, referring to FIGS. 7 and 8 together, FIG. 7 illustrates a schematic view of a three-dimensional structure of the lighting fixture 1 of FIG. 1 from another view; FIG. 8 illustrates an exploded view of FIG. 7. The light transmitting plate 13 includes a light transmitting portion 1310 and a second mounting portion 132. The light transmitting portion 1310 surrounds the second mounting portion 132. The plurality of the light transmission circles 131 are located on the light transmission portion 1310. Referring to FIGS. 9 and 10 together, the second mounting portion 132 is recessed towards a side away from the light emitting plate 11 relative to the light transmitting portion 1310 to form a mounting groove. The second mounting portion 132 is sleeved on the rotating shaft 12. The second mounting portion 132 defines a plurality of mounting holes 133 formed by spaced recesses in an inner side wall of the second mounting portion 132. An extension of a center axis of each the mounting hole 133 intersects with a center axis of the second mounting portion 132. The first ends 14 of the plurality of plug elements 14 are mounted within the plurality of mounting holes 133 respectively.

Therefore, the first ends 141 of the plurality of plug elements 14 can be reliably mounted within the plurality of mounting holes 133, they are not easily dropped, simplifying mount and facilitating operation of the light transmitting plate 13.

In some embodiments, the mounting hole 133 includes a hole portion 1331 and an opening portion. The hole portion 1331 is cylindrical in shape. An extension of a center axis of the hole portion 1331 intersects or is perpendicular to the center axis of the second mounting portion 132. The opening portion 1332 is disposed on a circumferential sidewall of the hole portion 1331 and is interconnected with the hole portion 1331. The hole portion 1331 has a diameter dimension equal to a diameter dimension of the first end 141 of the plug element 14 so that the first end 141 of the plug element 14 can be mounted within the hole portion 1331. The opening portion 1332 is located on the circumferential sidewall of the hole portion 1331 to facilitate molding as well as demolding of the mounting hole 133.

In some embodiments, referring again to FIG. 8, on a side of the light transmitting plate 13 away from the light emitting plate 11, the second mounting portion 132 is protruded relative to the light transmitting portion 1310 toward the side away from the light emitting plate 11, and correspondingly, a position on the second mounting portion 132 corresponding to the mounting hole 133 is protruded in a radial direction away from the second mounting portion 132, thereby forming a cylindrical and convex ribbed gripping portion 135.

When mounting or rotating the light transmitting plate 13, the light transmitting plate 13 can be operated by holding the gripping portion 135. Compared to operation of the light transmitting plate 13 by holding an edge of the light transmitting plate 13, operation of the light transmitting plate 13 can be simplified by holding the gripping portion 135.

Figure 11:
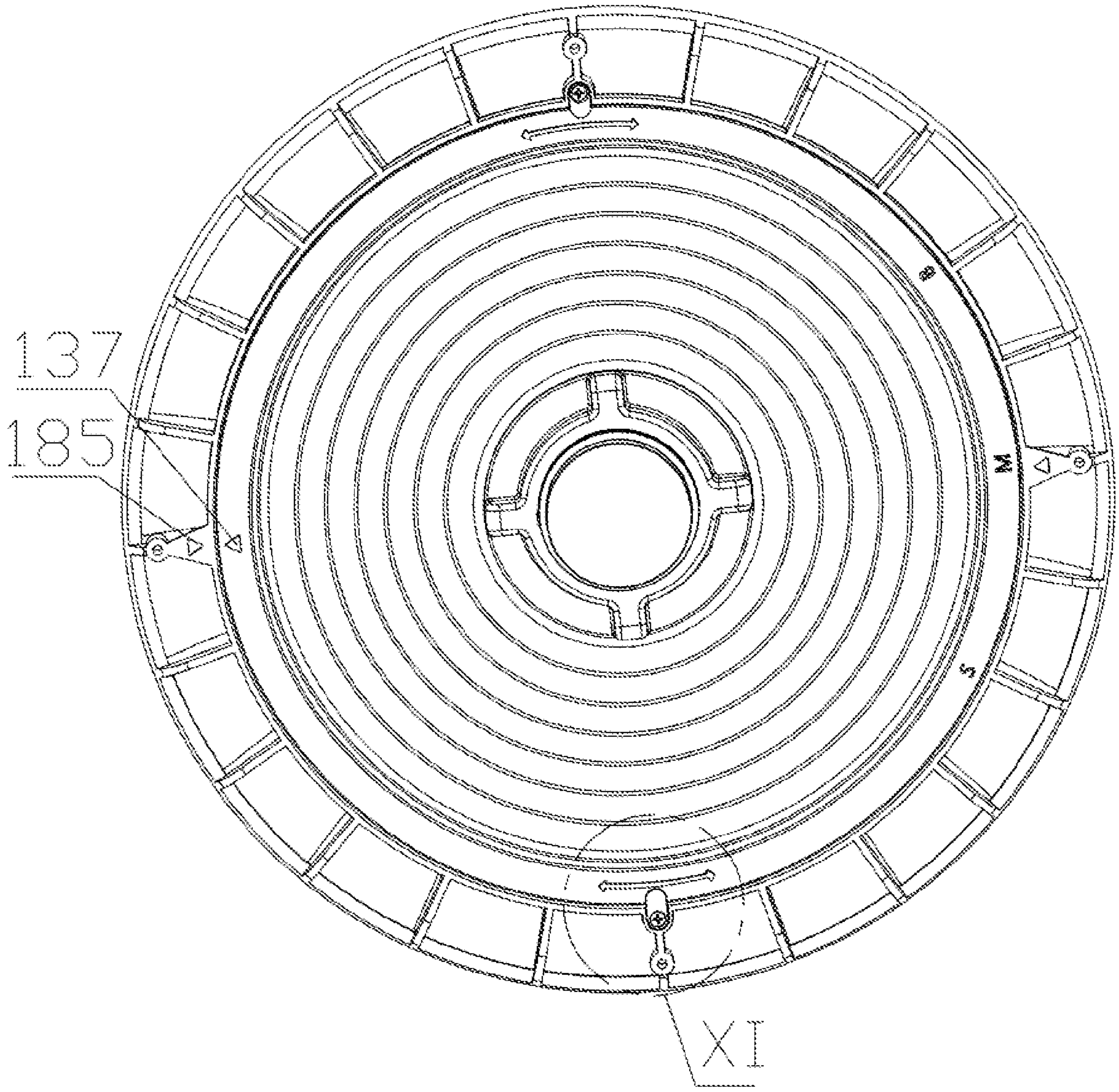
FIG. 11 illustrates a top view of FIG. 7.
Figure 12:
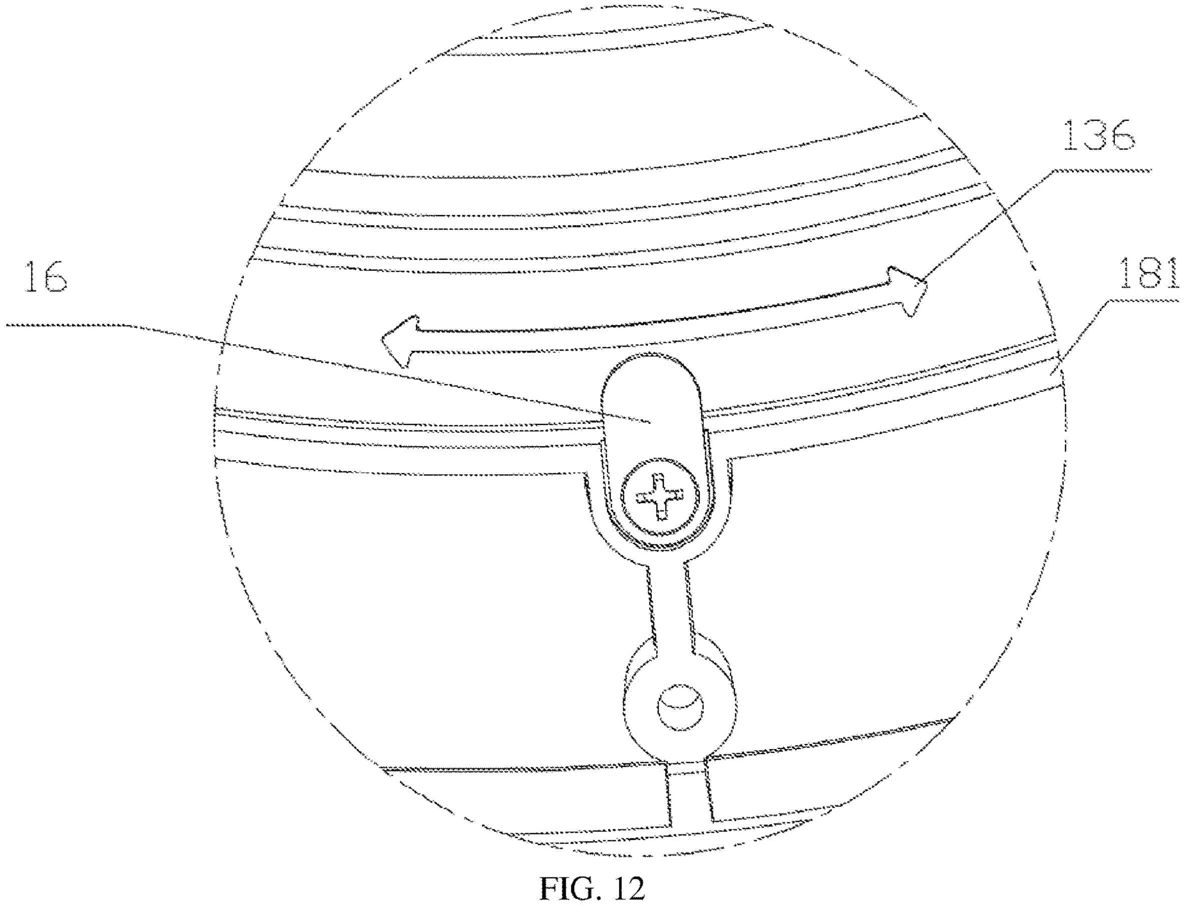
FIG. 12 illustrates a partially enlarged view of FIG. 11 at XI.

In some embodiments, referring again to FIG. 8, the lighting fixture 1 further includes a limiting member 16 and a heat sink 18. The heat sink 18 includes a circumferential sidewall 181 and a mounting plate 182. The circumferential sidewall 181 is connected to a circumferential edge of the mounting plate 182 to form a mounting groove 183. The light emitting plate 11 and the light transmitting plate 13 are mounted within the mounting groove 183. The light transmitting plate 13 is located on a side of the light emitting plate 11 away from the heat sink 18. Referring to FIGS. 11 and 12, FIG. 11 illustrates a top view of FIG. 7, FIG. 12 illustrates a partially enlarged view of FIG. 11 at XI. The limiting member 16 is located on a side of the light transmitting plate 13 away from the light emitting plate 11. One end of the limiting member 16 is connected to the circumferential sidewall 181 and the other end of the limiting member 16 rests against a surface of a side of the light transmitting plate 13 away from the light transmitting plate 13, to limit the light transmitting plate 13 from disengaging from the rotating shaft 12.

In some embodiments, the light transmitting plate 13 includes a limiting portion 136 at an edge of a side of the light transmitting plate 13 away from the light emitting plate 11. In this embodiment, the limiting portion 136 is an indicator arrow for indicating a direction of rotation of the light transmitting plate 13. The limiting portion 136 cooperates with the limiting member 16, e.g., the limiting member 16 can be snapped in a middle position of the limiting portion 136, and can limit the rotating movement of the light transmitting plate 13 relative to the light emitting plate 11.

In some embodiments, referring to FIG. 11, the light transmitting plate 13 includes a first marking portion 137 on a side of the light transmitting plate 13 away from the light emitting plate 11. The circumferential sidewall 181 includes a second marking portion 185. When the first marking portion 137 and the second marking portion 185 are aligned, the light transmitting plate 13 can be sleeved on the rotating shaft 12.

Therefore, with the first marking portion 137 and the second marking portion 185, it becomes easier for the light transmitting plate 13 to be able to be sleeved on the rotating shaft 12.

In some embodiments, referring again to FIG. 8, the heat sink 18 further includes an outer shell 186 and a plurality of heat dissipating fins 188. The outer shell 186 is in a form of a column. The circumferential sidewall 181 is located on an inside of the outer shell 186. The circumferential sidewall 181 is spaced apart from the outer shell 186. The plurality of heat dissipating fins 188 are spaced apart from and connected to the outer shell 186 and the circumferential sidewall 181. The plurality of heat dissipating fins 188 also extend on a side of the mounting plate 182 away from the light emitting plate 11.

Therefore, the outer shell 186 is a hollow annular ring, the mounting plate 182 has an outer diameter smaller than the inner diameter of the outer shell 186, the circumferential sidewall 181 is located within the annular ring of the outer shell 186, the circumferential sidewall 181 is spaced apart from the outer shell 186 to form a circular channel 189, and each of the heat dissipating fins 188 is connected between the inner wall of the outer shell 186 and the circumferential sidewall 181 and extends to the mounting plate 11 on a side away from the light emitting plate 11. The plurality of heat dissipating fins 188 are spaced apart in a circumferential direction of the mounting plate 182 with a center of the heat sink 18 being a center.

Therefore, the heat generated by the light emitting plate 11 is conducted by the heat dissipating fins 188 to a portion of the heat dissipating fins 188 located within the circular channel 189, which has a vertically sloping upward space equivalent to a chimney, thus enabling the use of the chimney effect to cause air underneath the light fixture 1 to pass through the circular channel 189, and flow out from above the circular channel 189; the heat generated by the light emitting plate 11 absorbed by the heat dissipating fins 188 is conducted by the heat dissipating fins 188 to the portion of the heat dissipating fins 188 located within the circular channel 189 and then carried away by the flow of air within the circular channel 189. Because the circular channel 189 is capable of forming the chimney effect, will enhance the rate of air convection within the circular channel 189 and accelerate the rate of heat dissipation.

In some embodiments, the heat sink 18 defines a through hole 187 in a center of the heat sink 18. The lighting fixture 1 further includes a power supply 19. The power supply 19 is mounted on a side of the mounting plate 182 back from the light emitting plate 11 and spaced from the plurality of heat dissipating fins 188.

Thereby, the flow of air from one side of the heat sink 18 to the other side of the heat sink 18 via the through hole 187 can be realized, and since the power supply 19 is mounted on the side of the mounting plate 182 back from the light emitting plate 11 and spaced apart from the plurality of heat dissipating fins 188, the air flow space between the power supply 19 and the heat sink 18 can be increased, thereby reducing wind resistance and thus increasing the flow of air from one side of the heat sink 18 to the other side of the heat sink 18 via the through hole 187, thereby reducing wind resistance and thereby increasing the amount of circulation flowing from one side of the heat sink 18 to the other side of the heat sink 18 via the through hole 187.

In some embodiments, the heat dissipating fins 1888 are designed with bofun type heat dissipating teeth, which can further reduce wind resistance, increase air flow, and dissipate heat better.

In some embodiments, the heat dissipating fins 188 are copper structures connected to the mounting plate 182 of the heat sink 18 by soldering. It will be appreciated that in other embodiments, the heat dissipating fins 188 are formed by aluminum extrusion in one-piece die casting together with other structural members of the heat sink 18.

In some embodiments, the heat dissipating fins 188 and the outer shell 186 are connected by means of a snap fit.

In some embodiments, the light transmitting plate 13 includes a connection port 139. The connection port 139 penetrates through the second mounting portion 132 and the gripping portion 135. The lighting fixture 1 further includes a communication module 17. The communication module 17 is mounted on the connection port 139. The communication module 17 may be different types of wireless communication circuits, such as one or a combination of WIFI, infrared transceiver module, ZigBee (Purple Bee Protocol), Bluetooth. The communication module 17 may also be a microwave sensor, an infrared body detection sensor, an ambient light sensor, etc., to realize intelligent control.

The above description of the technical solution of the subject matter of the present disclosure as well as the corresponding details are described above, and it can be understood that the above description is only at least one embodiment of the technical solution of the subject matter of the present disclosure, and some of the details can also be omitted in its specific implementation.

In addition, in at least one embodiment of the above present disclosure, there are multiple embodiments of the combination of implementation possibilities, various combination programs are limited to space will not be listed. The person skill in the art can freely combine the implementation of the above embodiments according to the needs of the specific implementation, in order to obtain a better application experience.

In summary, it can be understood that the present disclosure has the above mentioned excellent characteristics, so that it can be used to enhance the effectiveness of the previous technology has not been practical, and become a very practical value of the product.

The above is only a better example of the present disclosure, and is not intended to limit the present disclosure. Any modification, equivalent substitution or improvement made within the ideas and principles of the present disclosure shall be included in the protection scope of the present disclosure.

What is claimed is:

1. A lighting fixture, wherein comprising:

a lighting emitting plate;

a rotating shaft being mounted on a light exiting side of the lighting emitting plate, and a light transmitting plate being located on the light exiting side of the lighting emitting plate, and being rotatably connected to the rotating shaft; light emitted from the light emitting plate coming out after passing through the light transmitting plate;

wherein when the light transmitting plate is driven to make a rotating movement around a center axis of the rotating shaft, a distance between the light transmitting plate and the light emitting plate changes, and light exiting angle of the light which is emitted from the light emitting plate and then passes through the light transmitting plate coming out changes accordingly;

a circumferential wall of the rotating shaft defines a plurality of spiral grooves;

the lighting fixture comprises a plurality of plug elements;

the plurality of plug elements are in one-to-one correspondence with the plurality of spiral grooves;

each of the plurality of plug elements comprises a first end and a second end set opposite to the first end, the first end of each plug element is connected to the light transmitting plate, the second end of each plug element is inserted into the corresponding spiral groove and is capable of sliding within the spiral groove following the rotating movement of the light transmitting plate;

the spiral groove has at least two limiting points within the spiral groove;

the at least two limiting points are spaced apart within the spiral groove along a spiral direction of the spiral groove;

the at least two limiting points corresponds to at least two different distances between the light transmitting plate and the light emitting plate respectively, the at least two different distances between the light transmitting plate and the light emitting plate correspond to at least two different light exiting angles respectively; and when the plug element is engaged with one of the at least two limiting points, the light transmitting plate and the light emitting plate has corresponding distance, and the light which is emitted from the light emitting plate and then passes through the light transmitting plate comes out at corresponding light exiting angle.

2. The lighting fixture according to claim 1, wherein the spiral groove comprises a spiral portion, the at least two limiting points are defined within the spiral portion.

3. The lighting fixture according to claim 2, wherein the spiral groove further comprises a transition portion and an insertion portion; the transition portion interconnects the spiral portion with the insertion portion; the rotating shaft further comprises an end face at a side away from the light emitting plate; and the insertion portion extends from the circumferential wall of the rotating shaft and penetrates through the end face of the rotating shaft.

4. The lighting fixture according to claim 3, wherein an opening of the insertion portion in the end face of the rotating shaft is larger than an outer diameter of the second end of the plug element.

5. The lighting fixture according to claim 3, wherein the spiral portion comprises a first sidewall surface close to the end face, the spiral portion comprises a stop portion formed on an end of the spiral portion close to the transition portion, the stop portion close to the opening of the insertion portion and protrudes from the first sidewall surface toward a side away from the end face.

6. The lighting fixture according to claim 3, wherein the spiral portion comprises a first sidewall surface close to the end face, the spiral portion further comprises a second sidewall surface at a side away from the end face; the second end of the plug element comprises a convex ring; and the convex ring is mated with the first sidewall surface and the second sidewall surface of the spiral portion, respectively.

7. The lighting fixture according to claim 1, wherein the light transmitting plate comprises a light transmitting portion and a mounting portion, the light transmitting portion surrounds the mounting portion, the mounting portion is recessed relative to the light transmitting portion to form a recess on a side away from the light emitting plate, an inner side wall of the recess defines a plurality of mounting holes; the first ends of the plurality of plug elements are connected within the plurality of mounting holes, respectively.

8. The lighting fixture according to claim 7, wherein the light transmitting plate comprises a light transmitting portion and a mounting portion; the light transmitting portion surrounds the mounting portion, the mounting portion is recessed relative to the light transmitting portion to form a recess on a side away from the light emitting plate; an inner side wall of the recess defines a plurality of mounting holes, the first ends of the plurality of plug elements are connected within the plurality of mounting holes, respectively.

9. The lighting fixture according to claim 1, wherein, the lighting fixture further comprises a limiting member and a heat sink, the heat sink comprises a circumferential sidewall and a mounting plate, the circumferential sidewall surrounds the mounting plate to form a mounting groove, the light emitting plate and the light transmitting plate are mounted within the mounting groove, the light transmitting plate is located on a side of the light emitting plate away from the heat sink; the limiting member is located on a side of the light transmitting plate away from the light emitting plate; one end of the limiting member is connected to the circumferential sidewall, and the other end of the limiting member is resting against a surface of the light transmitting plate away from the light emitting plate.

10. The lighting fixture according to claim 9, wherein, the light transmitting plate comprises a limiting portion at an edge of a side of the light transmitting plate away from the light emitting plate, the limiting portion cooperates with the limiting member to limit the rotating movement of the light transmitting plate relative to the light emitting plate.

11. The lighting fixture according to claim 8, wherein, the mounting portion comprises a connection port; light transmitting plate comprises a gripping portion, the connecting port penetrates through the mounting portion and the gripping portion; the light fixture further comprises a communication module; the communication module is mounted on the connection port.

12. A lighting fixture, wherein comprising:

a lighting emitting plate;

a rotating shaft being mounted on a light exiting side of the lighting emitting plate, and a light transmitting plate being located on the light exiting side of the lighting emitting plate, and being rotatably connected to the rotating shaft; light emitted from the light emitting plate coming out after passing through the light transmitting plate;

wherein when the light transmitting plate is driven to make a rotating movement around a center axis of the rotating shaft, a distance between the light transmitting plate and the light emitting plate changes, and light exiting angle of the light which is emitted from the light emitting plate and then passes through the light transmitting plate coming out changes accordingly;

a circumferential wall of the rotating shaft defines a plurality of spiral grooves;

the lighting fixture comprises a plurality of plug elements;

the plurality of plug elements are in one-to-one correspondence with the plurality of spiral grooves; each of the plurality of plug elements comprises a first end and a second end set opposite to the first end, the first end of each plug element is connected to the light transmitting plate, the second end of each plug element is inserted into the corresponding spiral groove and is capable of sliding within the spiral groove following the rotating movement of the light transmitting plate; and the light transmitting plate comprises a light transmitting portion and a mounting portion, the light transmitting portion surrounds the mounting portion, the mounting portion is recessed relative to the light transmitting portion to form a recess on a side away from the light emitting plate, an inner side wall of the recess defines a plurality of mounting holes;

the first ends of the plurality of plug elements are connected within the plurality of mounting holes, respectively.

13. A lighting fixture, wherein comprising:

a lighting emitting plate;

a rotating shaft being mounted on a light exiting side of the lighting emitting plate, and a light transmitting plate being located on the light exiting side of the lighting emitting plate, and being rotatably connected to the rotating shaft; light emitted from the light emitting plate coming out after passing through the light transmitting plate;

wherein when the light transmitting plate is driven to make a rotating movement around a center axis of the rotating shaft, a distance between the light transmitting plate and the light emitting plate changes, and light exiting angle of the light which is emitted from the light emitting plate and then passes through the light transmitting plate coming out changes accordingly;

a circumferential wall of the rotating shaft defines a plurality of spiral grooves; the lighting fixture comprises a plurality of plug elements;

the plurality of plug elements are in one-to-one correspondence with the plurality of spiral grooves;

each of the plurality of plug elements comprises a first end and a second end set opposite to the first end, the first end of each plug element is connected to the light transmitting plate, the second end of each plug element is inserted into the corresponding spiral groove and is capable of sliding within the spiral groove following the rotating movement of the light transmitting plate;

the lighting fixture further comprises a limiting member and a heat sink, the heat sink comprises a circumferential sidewall and a mounting plate, the circumferential sidewall surrounds the mounting plate to form a mounting groove, the light emitting plate and the light transmitting plate are mounted within the mounting groove, the light transmitting plate is located on a side of the light emitting plate away from the heat sink; the limiting member is located on a side of the light transmitting plate away from the light emitting plate; and one end of the limiting member is connected to the circumferential sidewall, and the other end of the limiting member is resting against a surface of the light transmitting plate away from the light emitting plate.

* * * * *